United States Patent Office 3,156,710
Patented Nov. 10, 1964

3,156,710
5α-HYDROXY-6β-AMINOSTEROIDS OF THE ANDROSTANE SERIES
Kanzo Sasaki, Osaka, Japan, assignor to Shionogi & Co., Ltd., Osaka, Japan
No Drawing. Filed July 11, 1963, Ser. No. 294,237
5 Claims. (Cl. 260—349)

The present invention relates to a process for preparing 5α-hydroxy-6β-aminosteroids of the androstane series. More particularly, it relates to a process for converting a 5α,6α-epoxysteroid of the androstane series into the corresponding 5α-hydroxy-6β-aminosteroid of the androstane series substantially by two steps, i.e. ring opening and reduction.

Hitherto, it has been known that simple epoxides can be opened with amines or ammonia [Eliel: Steric Effects in Organic Chemistry, p. 106 (1956)]. On the basis of this knowledge, Batres et al. have succeeded in the ring opening of 5α,6α-epoxysteroids with amines to produce 5α-hydroxy-6β-aminosteroids wherein the amino group is tertiary [Batres et al.: J. Org. Chem., vol. 26, p. 878 (1961)]. The present inventor has attempted to synthesize a steroid having a free amino group and, on the basis of the said knowledge, to react a 5α,6α-epoxysteroid with ammonia. As the result of the attempt, however, only a resinous material has been recovered with no production of the objective amine. By the subsequent study, it has been discovered that a 5α,6α-epoxysteroid is ring-opened with hydrogen azide or alkali azide and the resulting 5α-hydroxy-6β-azidosteroid reduced in a per se conventional procedure to give the 5α-hydroxy-6β-aminosteroid. The present invention is based on this discovery.

Accordingly, it is a basic object of the present invention to embody a novel route for introducing a free amino group into the 6-position of steroids of the androstane series. Another object of the invention is to embody 5α-hydroxy-6β-aminosteroids of the androstane series which are pharmacologically active. A further object of the invention is to embody 5α-hydroxy-6β-azidosteroids of the androstane series which are intermediates in the said route. Other objects will be apparent to those conversant with the art to which the present invention pertains from the subsequent description.

According to the process of the present invention, the starting 5α,6α-epoxysteroid of the androstane series is first subjected to epoxy linkage fission by treating the same with hydrogen azide or alkali azide (e.g. sodium azide, potassium azide). The reaction is advantageously carried out in a suitable diluent such as water, methanol, ethanol, ether, dioxane and tetrahydrofuran or in a mixture of two or more such solvents. The reaction temperature may range, for example, from 80 to 150° C., when the reaction is executed in a sealed tube. The resulting 5α-hydroxy-6β-azidosteroid of the androstane series is then subjected to reduction in a per se conventional manner. As the reduction procedure, there may be advantageously adopted a catalytic reduction procedure or a reduction procedure using a reducing agent such as metal hydride. When the reduction procedure using a metal hydride (e.g. lithium aluminum hydride, lithium tritertiary butoxy aluminum hydride) is adopted, the reaction may be carried out by treating the 5α-hydroxy-6β-azidosteroid of the androstane series with the metal hydride in an inert organic solvent such as ether, tetrahydrofuran and dioxane advantageously at a temperature between room temperature (15 to 30° C.) and the boiling temperature of the solvent employed.

The resulting 5α-hydroxy-6β-aminosteroid of the androstane series may be, if necessary, further converted into the corresponding 5α-hydroxy-6β-acylaminosteroid of the androstane series by a conventional acylation procedure such as treatment with a lower alkanoic anhydride (e.g. acetic anhydride, propionic anhydride) and an organic base (e.g. pyridine, picoline), the latter being sometimes purified more readily than the former.

The thus-produced 5α-hydroxy-6β-aminosteroid of the androstane series and the 6-acylate thereof are useful as CNS (central nervous system) depressing agents. For instance, 3β,5α,17β-trihydroxy-6β-aminoandrostane induces anesthetic state in mice, when administered at a non-toxic dose by intraperitoneal route.

The starting 5α,6α-epoxysteroid of the androstane series may, apart from the substituent at the 5- and 6-positions, contain further substituents, such as free or functionally converted hydroxyl, oxo or carboxyl groups, also methyl groups, and it may also contain double bonds. In the course of the reduction step of the present process, free oxo groups may be simultaneously converted into hydroxyl groups and free and functionally converted carboxyl groups into hydroxymethyl groups. If such simultaneous conversion is not favorable, the previous protection of the convertible groups according to a per se conventional manner is required. Specific starting materials are, for example, 17β-acetoxy-5α,6α-epoxyandrostan-3-one 3-ethyleneketal [Bowers et al.: Tetrahedron, vol. 7, p. 138 (1959)], 3β,17β-dihydroxy-17α-methyl-5α,6α-epoxyandrostane 3,17-diacetate [Julia et al.: Helv. Chim. Acta, vol 35, p. 2080 (1952)], methyl 3β-acetoxy-5α,6α-epoxyandrostan-17β-carboxylate [Heusser et al.: Helv. Chim. Acta, vol. 32, p. 1334 (1949)], 3β-acetoxy-5α,6α-epoxyandrostan-17-one, 3β,17β-dihydroxy-5α,6α-epoxyandrostane 3,17-diacetate [Ringold et al.: J. Org. Chem., vol. 22, p. 99 (1957)], etc.

The following examples illustrate presently-preferred embodiments of the invention. In these examples, abbreviations each has the conventional meaning, e.g. mg.=milligram(s), g.=gram(s), ml.=milliliter(s), ° C.=degrees centigrade.

*Example 1*

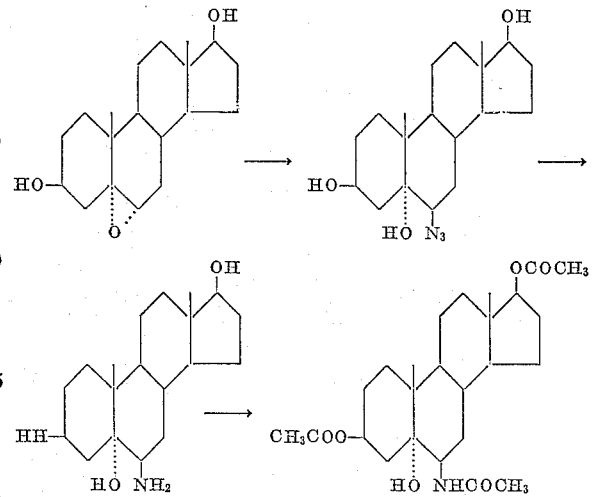

(A) *Preparation of 3β,5α,17β-trihydroxy-6β-azidoandrostrane.*—A solution of 3β,17β-dihydroxy-5α,6α-epoxyandrostane [Wada: Yakugaku Zasshi, Vol. 79, p. 684 (1959)] (0.98 g.) in ethanol (8 ml.) is combined with a solution of sodium azide (0.5 g.) in water (1.5 ml.), and the resulting mixture is heated in a sealed tube for 32 hours at 145° C. The reaction mixture is concentrated under reduced pressure. The condensate is combined with water and shaken with ether. The ether phase is washed with water, dried over anhydrous sodium sulfate and evaporated. The residue is crystallized from a mixture of methanol and ether to give 3β,5α,17β-trihydroxy-6β-azidoandrostane (0.95 g.) as crystals melting at 197.5 to 199° C.

(B) *Preparation of 3β,5α,17β-trihydroxy-6β-amino-androstane.*—A solution of 3β,5α,17β-trihydroxy-6β-azido-androstane (100 mg.) in anhydrous tetrahydrofuran (5 ml.) and a solution of lithium aluminum hydride (100 mg.) in anhydrous ether (3 ml.) are combined together, and the resulting mixture is refluxed for 3.5 hours on a water bath. Excess of the reducing agent is decomposed with water. The reaction mixture is concentrated under reduced pressure. The residue is extracted with anhydrous ethanol. The ethanol extract is evaporated and crystallized from a mixture of methanol and ether to give 3β,5α, 17β-trihydroxy-6β-aminoandrostane (50 mg.) as crystals melting at 246 to 249° C. (decomp.).

(C) *Preparation of 3β,5α,17β-trihydroxy-6β-acetylaminoandrostane 3,17-diacetate.*—A mixture of 3β,5α,17β-trihydroxy-6β-aminoandrostane (15 mg.) in pyridine (0.5 ml.) and acetic anhydride (0.5 ml.) is stirred for 16 hours at room temperature (15 to 30° C.). The reaction mixture is concentrated under reduced pressure. The residue is combined with water and shaken with ether. The ether phase is washed with dilute hydrochloric acid and then dilute aqueous solution of sodium carbonate, dried over anhydrous sodium sulfate and evaporated. The residue is crystallized from a mixture of acetone and hexane to give 3β,5α,17β-trihydroxy-6β-acetylaminoandrostane 3,17-diacetate (12 mg.) as crystals melting at 271 to 273.5° C.

*Analysis.*—Calcd. for $C_{25}H_{39}O_6N$: C, 66.79; H, 8.75; N, 3.12. Found: C, 66.31; H, 8.99; N, 3.06.

*Example 2*

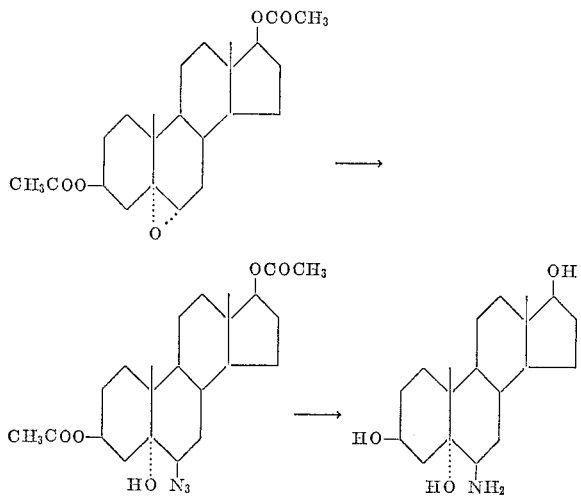

(A) *Preparation of 3β,5α,17β-trihydroxy-6β-azidoandrostane 3,17-diacetate.*—3β,17β - dihydroxy-5α,6α-epoxy-androstane 3,17-diacetate [Ringold et al.: J. Org. Chem., Vol. 22, p. 99 (1957)] (1.00 g.) is subjected to reaction with sodium azide as in Example 1 (A) whereby 3β,5α, 17β-trihydroxy-6β-azidoandrostane is produced. The product (1.01 g.) is combined with a mixture of pyridine (7 ml.) and acetic anhydride (7 ml.) and allowed to stand at room temperature (15 to 30° C.) overnight. Water is added to the reaction mixture. The precipitated crystals are collected by filtration, washed with water and recrystallized from a mixture of acetone and hexane to give 3β,5α,17β-trihydroxy-6β-azidoandrostane 3,17 - diacetate (1.00 g.) as crystals melting at 180 to 181.5° C.

*Analysis.*—Calcd. for $C_{23}H_{35}O_5N_3$: C, 63.72; H, 8.14; N, 9.69. Found: C, 63.55; H, 8.23; N, 9.52.

(B) *Preparation of 3β,5α,17β-trihydroxy-6β-aminoandrostane.*—3β,5α,17β - trihydroxy - 6β - azidoandrostane 3,17-diacetate (100 mg.) is subjected to reduction with lithium aluminum hydride as in Example 1 (B) whereby 3β,5α,17β-trihydroxy-6β-aminoandrostane (92 mg.) is produced.

*Example 3*

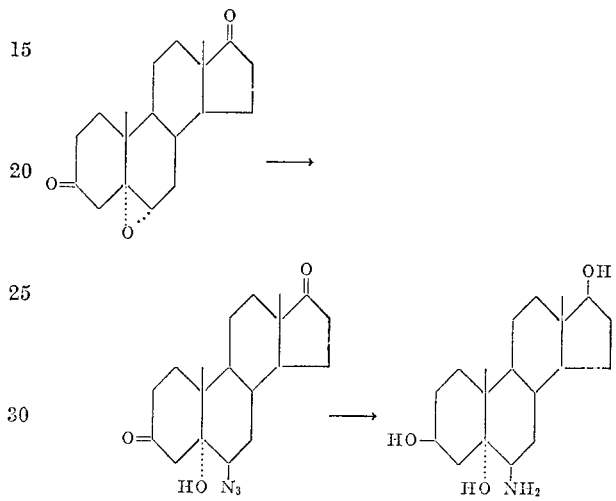

(A) *Preparation of 5α-hydroxy-6β-azidoandrostane-3,17-dione.*—5α,6α - epoxyandrostane-3,17-dione [Campbell et al.: J. Am. Chem. Soc., vol. 80, p. 4717 (1958)] (1.00 g.) is subjected to reaction with sodium azide as in Example 1 (A) whereby 5α-hydroxy-6β-azidoandrostane-3,17-dione (0.84 g.) is produced. Recrystallization of the product from a mixture of acetone and hexane gives crystals melting at 231 to 232° C. (decomp.).

*Analysis.*—Calcd. for $C_{19}H_{27}O_3N_3$: C, 66.06; H, 7.88; N, 12.17. Found: C, 65.95; H, 8.05; N, 12.40.

(B) *Preparation of 3β,5α,17β-trihydroxy-6β-aminoandrostane.*—5α - hydroxy - 6β - azidoandrostane-3,17-dione (500 mg.) is subjected to reduction with lithium aluminum hydride as in Example 1 (B) whereby 3β,5α,17β-trihydroxy-6β-aminoandrostane (410 mg.) is produced.

What is claimed is:
1. 3β,5α,17β-trihydroxy-6β-azidoandrostane.
2. 3β,5α,17β-trihydroxy - 6d - azidoandrostane 3,17-diacetate.
3. 5α-hydroxy-6β-azidoandrostane-3,17-dione.
4. 3β,5α,17β-trihydroxy-6β-aminoandrostane.
5. 3β,5α,17β - trihydroxy - 6β - acetylaminoandrostane 3,17-diacetate.

References Cited in the file of this patent
UNITED STATES PATENTS
2,996,521    Matthews et al. _____ Aug. 15, 1961
OTHER REFERENCES
Boyer et al.: "Alkyl and Aryl Azides," Chemical Reviews, vol. 54, No. 1, February 1954, p. 10.